United States Patent [19]

Woodworth

[11] Patent Number: 5,323,304
[45] Date of Patent: Jun. 21, 1994

[54] A.C. STORAGE MODULE FOR REDUCING HARMONIC DISTORTION IN AN A.C. WAVEFORM

[75] Inventor: George K. Woodworth, Gainesville, Va.

[73] Assignee: Georator Corporation, Manassas, Va.

[21] Appl. No.: 89,226

[22] Filed: Jul. 8, 1993

Related U.S. Application Data

[63] Continuation-in-part of Ser. No. 826,958, Jan. 27, 1992.

[51] Int. Cl.$^5$ .............................................. H02M 1/12
[52] U.S. Cl. ........................................ 363/47; 363/39; 307/105; 333/175
[58] Field of Search .................... 363/39, 47; 307/105, 307/102; 333/167, 168, 175-185; H02M 1/12

[56] References Cited

U.S. PATENT DOCUMENTS

| | | | |
|---|---|---|---|
| 2,333,211 | 7/1942 | Stevens | 171/119 |
| 2,743,412 | 4/1956 | McLean | 322/96 |
| 3,219,917 | 11/1965 | Dome | 323/76 |
| 3,237,089 | 2/1966 | Dubin et al. | 323/44 |
| 3,289,064 | 11/1966 | Doyle et al. | 320/1 |
| 3,333,203 | 7/1967 | Baker | 328/59 |
| 3,683,269 | 8/1972 | Wanlass | 323/44 |
| 3,683,271 | 8/1972 | Kobayashi | 323/76 |
| 3,881,137 | 4/1975 | Thanawala | 317/53 |
| 3,955,134 | 5/1976 | Woodford | 323/61 |
| 4,259,705 | 3/1981 | Stifter | 361/56 |
| 4,558,391 | 12/1985 | Ward et al. | 361/155 |
| 4,630,163 | 12/1986 | Cooper et al. | 361/56 |
| 4,724,333 | 2/1988 | Hedin | |
| 4,725,739 | 2/1988 | McCartney et al. | 307/35 |
| 4,808,843 | 2/1989 | Hedin | |
| 4,831,487 | 5/1989 | Ruoss | 361/111 |
| 4,939,486 | 7/1990 | Bergdahl et al. | 333/175 |
| 5,005,100 | 4/1991 | Owen | 361/35 |

OTHER PUBLICATIONS

Veley, Benchtop Electronics Reference Manual, 2nd Edition, pp. 281-285, TAB Books, 1990.

Primary Examiner—Emanuel T. Voeltz
Attorney, Agent, or Firm—Kirkpatrick & Lockhart

[57] ABSTRACT

A circuit for correcting perturbations in a power system signal operating at a system line frequency includes a capacitor for drawing a capacitive current and a first inductor for drawing an inductive current substantially equal in amplitude and substantially one hundred eighty degrees out of phase with the capacitive current. The first inductor is connected in parallel with the capacitor to form a storage module for storing energy therein wherein the storage module is tuned to resonate at the system line frequency and wherein the storage module is connected in parallel across the load. A second inductor connected in series between a power source and the load isolates the power source from the load.

10 Claims, 3 Drawing Sheets

CLEAN UTILITY POWER LINE SINEWAVE

*Fig.3.*

SINEWAVE WITH HARMONIC DISTORTION

*Fig.4.*

DISTORTION OF THE SINEWAVE DUE IMPULSE LOADING

*Fig.5.*

WAVEFORM DISTORTION CORRECTED BY THE ACSM

A.C. STORAGE MODULE FOR REDUCING HARMONIC DISTORTION IN AN A.C. WAVEFORM

This is a continuation-in-part application of copending U.S. patent application Ser. No. 07/826,958 filed Jan. 27, 1992 pending.

FIELD OF THE INVENTION

The present invention is directed generally to a parallel resonant circuit for storing energy and more particularly, to a parallel resonant circuit for storing alternating current energy for reducing harmonic distortion in an alternating current waveform.

DESCRIPTION OF THE BACKGROUND OF THE INVENTION

There is an increasing population of electrical and electronic equipment utilizing alternating current line rectifiers, especially office computers, motor speed controllers and other equipment which draw nonlinear currents. A concern in the power engineering industry focuses on the disruptive harmonic effects of voltage transients and spikes caused by those electronic or nonlinear loads. Many times, the equipment which is causing those harmonics is, at the same time, sensitive to those harmonics that similar devices are creating. In addition to the harmonics damaging the device producing them, those harmonics may also adversely affect other pieces of electrical equipment connected to the power line and may even damage the power generation and distribution system itself.

Nonlinear loads may affect two types of power systems: single-phase, most common in office settings, and three-phase, most common in industrial applications. Harmonic induced problems frequently manifest themselves in improper operation, malfunction, shutdown of the equipment, or premature equipment failures. In three-phase, four wire systems, some harmonic currents, for example, the third harmonic, do not null at the neutral conductor, but rather sum, which may cause over-loading of that neutral conductor. The inherent danger in such overloading is the risk of damage or fire, as there is no circuit breaker on the neutral to limit the current flow.

Known techniques to improve the quality of the power system voltage waveforms are largely ineffective in correcting that problem. One common way to address the harmonics problem is to attempt to restrict harmonic currents by use of passive filters or harmonic traps. Those filters are tuned to a specific frequency, normally the highest amplitude harmonic. Filters operate by "notching out" portions of the disturbance. Such filters may absorb some of the harmonic energy, however, the dissipated energy is wasted as nonproductive heat loss. Further, such absorption is limited to a specific frequency and thus, voltage spikes or dips which occur at frequencies other than the specific frequency of the filter are not corrected nor are they correctable without the addition of an additional filter.

Generic "line clipping devices" do not restore minor voltage dips or harmonic distortion and can not clamp or reduce any electrical disturbances that occur below the peak amplitude of the sine wave. With respect to three-phase systems, to upgrade the present electrical distribution system to reduce the effective power source impedance by substituting larger neutral and phase conductors is both costly and often an impractical solution.

In view thereof, it is an object of the present invention to substantially reduce or eliminate the harmonic effects which nonlinear loads and switched power loads may create on a power distribution system, thereby permitting the distribution system to provide clean, quality power to other sensitive equipment. It is a further object of the invention to provide a local, low impedance alternating current source of quality power to satisfy the requirements of sensitive load equipment which may be connected to its output. It is a feature of the present invention to provide stored energy in a parallel resonant circuit to smooth the effects which nth-order harmonics and voltage spikes or dips may have on that power distribution system. It is a further feature of the present invention to provide an in-line inductance to further isolate the power source from the effects of non-linear loading. It is an advantage of the present invention that when harmonics and/or transient voltage disturbances do occur on the power line, the effects of such disturbances will not impact the equipment attached thereto as the power line waveform will be instantaneously smoothed. A further advantage of the present invention is that a device embodying the present invention may be advantageously applied to any type of sinusoidal, fixed frequency, alternating current power system.

SUMMARY OF THE INVENTION

The present invention is directed to an alternating current storage module for correcting voltage and current distortions in a power system operating at a system line frequency wherein the storage module is connected in parallel with a load's impedance. The storage module includes a capacitor for drawing a capacitive current and a first inductor for drawing an inductive current equal in amplitude and one hundred eighty degrees out of phase with the capacitive current. The first inductor is connected in parallel with the capacitor to form a storage module for storing energy. The storage module is tuned to resonate at the system line frequency such that the parallel resonant reactance of the storage module is at its peak at the system line frequency and lower at frequencies above and below the system line frequency. As such, the storage module absorbs voltage perturbations in excess of the amplitude of the power system signal at all frequencies above or below the system line frequency and provides energy to restore notches in the amplitude of the power system signal at all frequencies above or below the system line frequency. According to a preferred embodiment of the invention, a second inductor is connected in series between a power source and the load impedance for isolating the power source from that load impedance.

The present invention is also directed to a method for correcting voltage and current distortions in a power system operating at a system line frequency comprising the steps of forming a storage module wherein the storage module comprises a capacitor for drawing a capacitive current and a first inductor for drawing an inductive current equal in amplitude and one hundred eighty degrees out of phase with the capacitive current connected in parallel with the capacitor, wherein the storage module is tuned to resonate at the system line frequency. The method further comprises the step of connecting the parallel resonant circuit in parallel with a load and may further include the step of inserting a second inductor connected in series between an alternating current power source and the load.

Accordingly, the addition of a device constructed according to the present invention greatly diminishes the effective power line impedance as seen by the load at frequencies above and below the system's power line frequency and thereby limits any local distortion. The impedance at the output terminals of the device is very low and may source current at frequencies both above and below that of the power line. The parallel impedances of the power line and the device(s) connected to it provide an impedance far less than either impedance alone. This lower source impedance offers the load a stiffer power source which does not sag or drop out during high loading conditions due to load turn-on / turn-off impulses.

BRIEF DESCRIPTION OF THE DRAWINGS

The various objects, advantages and novel features of the present invention will now be described, by way of example only, in the following detailed description when read in conjunction with the appended drawings, in which.

DETAILED DESCRIPTION OF THE PREFERRED EMBODIMENT

Figure 1:
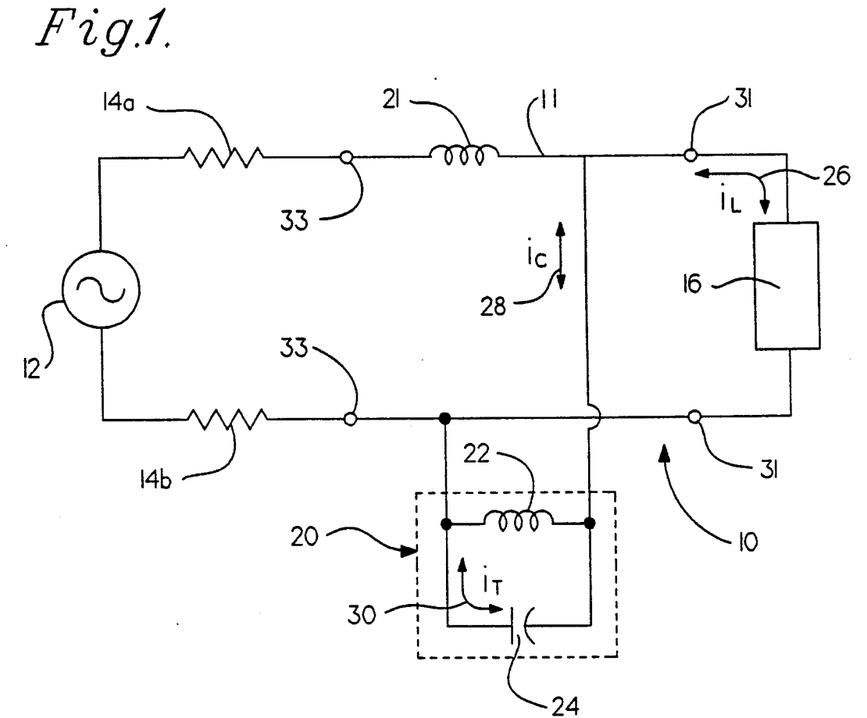
FIG. 1 is a schematic diagram illustrating the manner in which a circuit constructed according to the present invention may be connected to an A.C. power distribution system.
Figure 2:
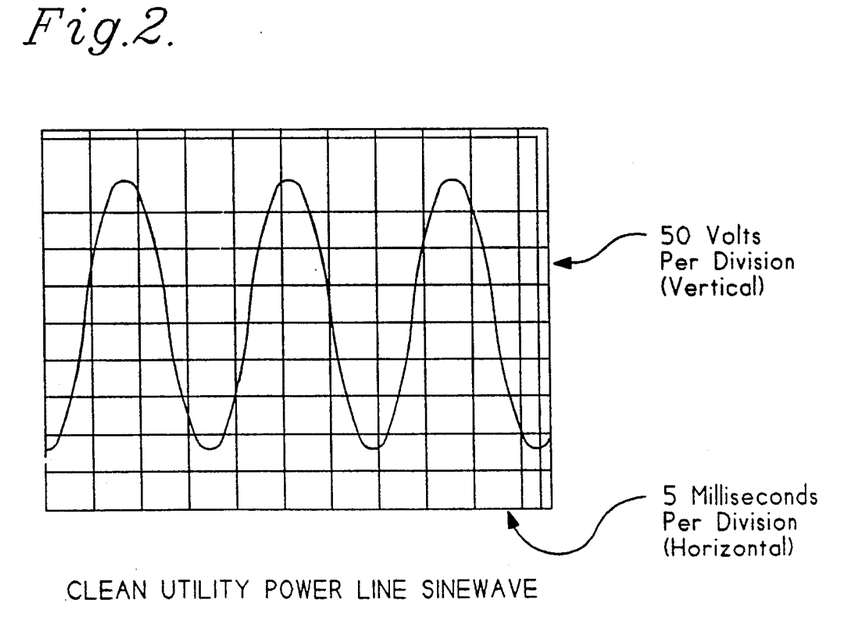
FIG. 2 is a representation of a clean utility power signal.

With reference to FIG. 1, there is shown a schematic of an electrical circuit 10 embodying the alternating current storage module 20 of the present invention. Like reference numerals will be employed among the various figures to denote like elements. As shown in FIG. 1, the electrical circuit 10 includes an alternating current power source 12, power distribution system impedances 14a, 14b along the power line 11, and the alternating current storage module, represented by the dashed line box 20. The alternating current storage module 20 comprises an inductor 22 and capacitor 24 connected in parallel forming a parallel resonant circuit. An inductor 21 is connected in series between the power source 12 and the load 16 along the power line 11. The power line 11 provides a power signal to the load 16 which is ideally in the form as shown in FIG. 2.

The primary internal energy storage components of the storage module 20, the capacitor 24 and the inductor 22, are tuned to a parallel resonant frequency that matches the power line frequency which may, for example, be 60 Hz. The reactive impedances of the components in the storage module 20 are substantially equal in value and opposite in sign resulting in a current that circulates between the inductor 22 and capacitor 24 twice per sine wave. That current is represented by numeral 30 in FIG. 1. The circulating current 30 continues to ring back and forth until it is utilized or dissipated in losses within the capacitor 24 and inductor 22. The storage module 20 is sized such that the circulating current 30 is on the order of the load current 26. When the storage module 20 is connected to the power line 11, the line voltage provides a small amount of correction current, shown as 28 in FIG. 1, to replace the cycle to cycle losses within the storage module 20. In a steady-state condition without a load on the output terminals 31, the correction current 28 feeding the storage module 20 is at a minimum value and the energy stored in the storage module 20 is at its maximum value.

All of the energy stored within the storage module 20 is available at the instant a load 16 is placed across the output terminals 31. If the line voltage across the storage module 20 suddenly deviates in amplitude by only a few volts, whether because of source voltage distortion present at the input terminals 33, or because of distortion current drawn by the load from the output terminals 31, a heavy correction current 28 will flow as the storage module 20 moderates this change. As will be understood by those skilled in the art, the polarity of that correction current 28 will be of the proper sign necessary to reduce the voltage rate of change across the storage module 20. In that manner the line voltage is integrated by the storage module 20 which reduces the amount of distortion and size of voltage deviations present on the output terminals 31. The integral of noise and harmonic voltage deviations is normally a zero value. Any transient energy delivered to or absorbed by the load 16 at one point in the waveform is typically offset by an equivalent and opposite noise energy component elsewhere on the sine wave.

Figure 3:
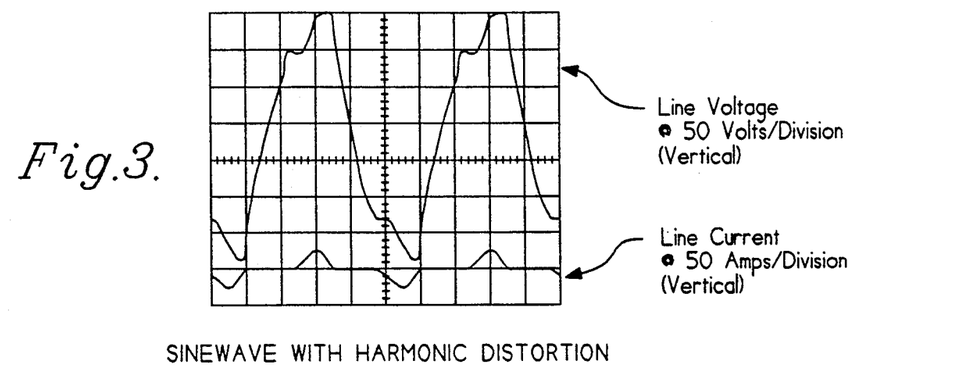
FIG. 3 is a representation of a power line voltage waveform exhibiting distortion due to the presence of non-linear loads.
Figure 4:
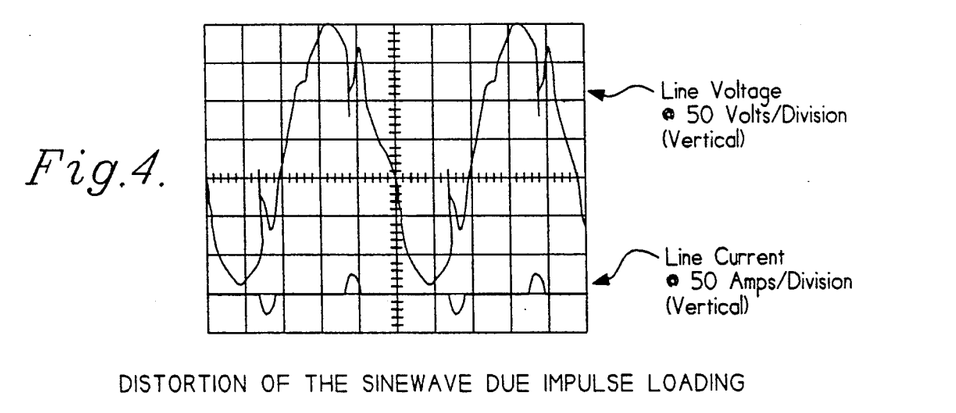
FIG. 4 is a representation of a power line voltage waveform illustrating distortion due to impulse loading effects.
Figure 5:
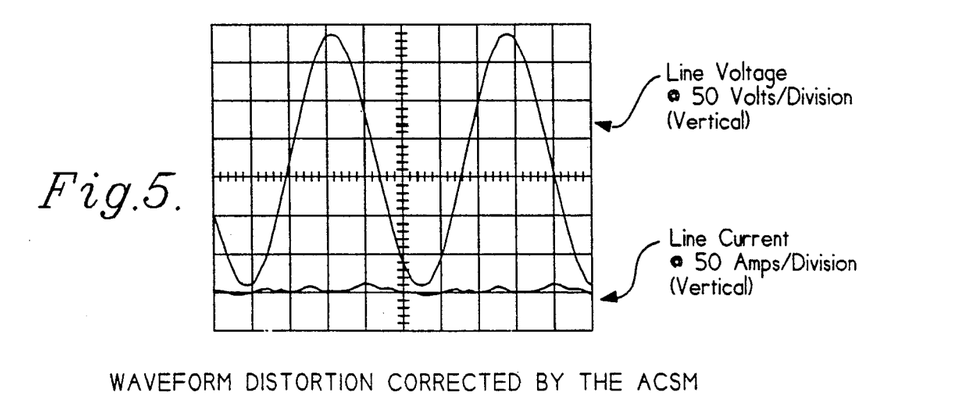
FIG. 5 illustrates the waveform of FIG. 5 as corrected by the alternating current storage module of the present invention.

FIG. 3 illustrates a sine wave with harmonic distortion. FIG. 4 illustrates a sine wave with distortion due to impulse loading. Impulse line voltage disturbances due to the turn-on and turn-off cycles of a load 16 or lightning-type discharges may cause fast rising spike waveform distortion. The integration effect of the storage module 20 reduces the amplitude of those impulses and spreads or redistributes the disturbance over time. The process of compressing spike impulses by spreading the noise energy in time reduces the peak amplitude of the noise energy. FIG. 5 illustrates a result of that spike suppression capability. That spike suppression capability is effective at all points of the power line voltage waveform and is especially effective at the zero voltage waveform crossover regions.

The storage module 20 may be advantageously connected to the power receptacle feeding nonlinear loads to correct harmonic distortion and impulse loading problems. High amplitude impulse load current pulses are now supplied by the combination of the storage module 20 and the power line 11. Currents in the hundreds of amperes are readily provided by the storage module's 20 capacitor 24 to replenish gaps caused by the load 16 sudden demands. The energy needed to replenish the storage module 20 is provided gradually by the power line 11 reducing any effects of distortion on the voltage waveform. The smoothing flywheel effect of the storage module 20 circuit helps average out loading fluctuations as seen by the power source 12.

As described in more detail below, the storage module 20 is designed to assist the prime power source 12 to handle non-linear loads. Internally the components of the storage module 20 are sized to store sufficient energy to withstand any anticipated load impulses.

The capacitor 24 of the storage module 20 provides the integration function that corrects the voltage deviations present on the power line 11. Because the capacitor 24 value used is typically large, the capacitor 24 has a very low internal resistance which presents a small capacitive impedance at the power line frequency. This reactive impedance value falls to lower values at the higher order harmonic frequencies.

Noise impulses that have sharp high frequency characteristics are composed of harmonic frequencies that may extend up into the megaHertz frequency range where the reactance of the capacitor 24 is on the order of milliohms. As the apparent impedance of the capacitor 24 declines, the current required to change the voltage impressed across the capacitor 24 grows rapidly. Testing has shown that a storage module 20 capable of storing a single Joule of energy connected to a power line 11 will absorb or supply hundreds of amperes of current needed to suppress noise spikes of 100 volts or less.

The inductor 22 in the storage module 20 is used to draw an inductive current that offsets or nulls the circulating capacitive current. If a capacitor 24 of the same size used in the storage module 20 were connected to the power line 11 without an inductor 22, that capacitor 24 would provide an equal noise correction effect. Nonetheless, the inductor 22 serves two functions. First, the inductor 22 minimizes the line current 28 circulating between the power source 12 and the capacitor 24. Second, the inductor 22 prevents the capacitor 24 from resonating or otherwise disturbing the load 16 or other system components.

The inductive current is preferably one hundred eighty (180) degrees out of phase with the capacitive current to balance and thereby neutralize the effect of the capacitive current. That resonant condition of the inductor and capacitor provides a very high impedance to the power source 12 at the system line frequency and therefore draws a minimum line correction current 28 during steady-state operation. That correction current 28 is only make-up energy for the storage module 20 and is resistive in nature at the resonant frequency of inductor 22 and capacitor 24. The inductor 22 and capacitor 24 at resonance are electrically balanced and therefore do not react with other circuit elements connected to the power line.

The storage of about one Joule of energy for use on a typical North American power distribution system of 115 VAC RMS requires a capacitor of about 90 microfarads. The impedance of this capacitor is predicted by the formula:

$$X_c = \frac{1}{2\pi f C}$$

wherein
X$_c$=capacitive reactance
f=operating frequency
C=capacitance

As can be seen, that formula takes into consideration the operating frequency. As an example, at a power line frequency of 60 Hertz, a 90 microfarad capacitor has a capacitive reactance of 29.4 ohms. At higher frequencies the impedance value continues to decline and at a frequency of 10,000 Hertz, that impedance would be only 170 milliohms.

The amount of energy stored in the storage module 20 can be calculated by determining the peak voltage available from the power source 12 and selecting the electrical size of the capacitor 24. That voltage value and the capacitor's size determine the amount of charge stored as defined by the formula:

$$E_j = \tfrac{1}{2} C E^2$$

wherein:
E$_j$=energy stored (Joules)
C=capacitance
E=peak voltage

As can be seen, stored energy increases linearly as the capacitor size is increased and is a squared function of the change in voltage.

The size of the inductor 22 needed to resonate with the capacitor 24 can be calculated by using the formula:

$$L = \frac{\left[\frac{1}{(2\pi f)}\right]^2}{C}$$

wherein:
L=inductance (Henrys)
f=operating frequency
C=capacitance (Farads)

The inductor 22 value is affected by the operating frequency of the power source 12 and decreases in size as the operating line frequency is increased.

The circulating current present in the storage module 20 is described by the following formula:

$$I_T = \frac{E_{line}}{X_L} = \frac{E_{line}}{X_c}$$

Wherein:
I$_T$=Storage module current (RMS Amps)
E$_{LINE}$=Power Source Voltage (RMS)
X$_L$=Inductive Reactance
X$_c$=Capacitive Reactance That information is necessary to determine the ratings of the L and C components. Capacitors are preferably selected to withstand the anticipated operating line voltage and the calculated circulating or ripple current. The amount of capacitor current in any capacitor can be proportionally scaled to accommodate a variety of capacitor technologies desired. Alternatively, multiple smaller value capacitors may be connected in parallel to provide the total capacitance value required. Such division of the capacitive requirements allows the heating effects caused by the current to be distributed to numerous physical capacitors to facilitate component cooling.

The amount of current circulating within the storage module 20 is identical for both the capacitor 24 and inductor 22. The inductor 22 must be designed with wiring sized to carry the current 30 without excessive losses that would cause internal heating. The core of the inductor 22 must also be sufficient in cross-section to prevent magnetic saturation which would cause poor circuit operation and possibly add distortion to the power line 11. The internal wiring of the storage module 20 preferably provides low impedance to allow the very high and rapidly rising noise correction currents to pass in an unimpeded manner to the power distribution system.

As shown in FIG. 1, an inductor 21 may be advantageously positioned in series with the power source 12 and the load 16. The series inductor 21 isolates the power source 12 from the load such that harmonic currents which may be generated by the load will minimally affect the power source 12. Further, the series inductor 21 serves to increase the effective impedance of the power source 12 as seen by the load 16, which in turn causes the load 16 to primarily draw additional peak load current 26 from the storage module 2o instead of the power source 12, thus reducing harmonic currents supplied by the power source 12 even further.

By way of example, in a 120 VAC, 15 ampere circuit, a series inductor 21 may have a value of approximately 8 to 15 millihenries, the capacitor 24 may have a value of approximately 400 microfarads and inductor 22 may have a value of approximately 18 millihenries.

Figure 6:
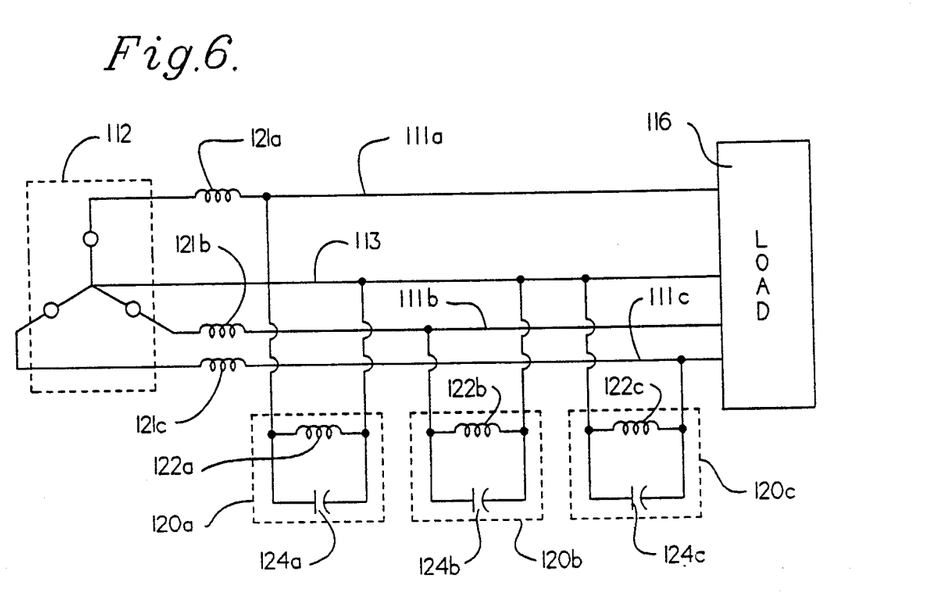
FIG. 6 is a schematic diagram of another embodiment of the alternating current storage module connected in a 3-phase wye-configuration power system.

The present invention may also be adapted for use in three-phase power systems. With reference to FIG. 6, there is shown a circuit comprising a three-phase power source 112 in a wye-configuration connected to a load 116. Three conductors 111a, 111b, 111c and a neutral conductor 113 provide a current path from the power source 112 to the load 116. Storage modules 120a, 120b, 120c constructed according to the present invention are connected across conductor 111a and the neutral conductor 113, conductor 111b and the neutral conductor 113, and conductor 111c and the neutral conductor 113, respectively. Each of the storage modules 120a, 120b, 120c comprise a capacitor 124a, 124b, 124c, and an inductor 122a, 122b, 122c connected in parallel. As previously described, the storage modules 120a, 120b, 120c are tuned to the system line frequency and are sized so as to supply the integrating current required to reduce the effects of harmonics as seen by the load 116. Inductors 121a, 121b, and 121c may be advantageously placed in series between the power source 112 and the storage modules 120a, 120b, 120c to isolate the power system from the effect of harmonic distortion and to increase the impedance of the power source 112 as seen by the load 116 so as to enable more efficient use of the storage modules 120a, 120b and 120c.

By way of example only, a three phase application comprising a 480 VAC power source may utilize series inductors 121a, 121b, 121c having values of approximately 6 millihenries, capacitors 124a, 124b, 124c having values of approximately 100 microfarads, and inductors 122a, 122b, 122c having values of approximately 65 millihenries.

Figure 7:
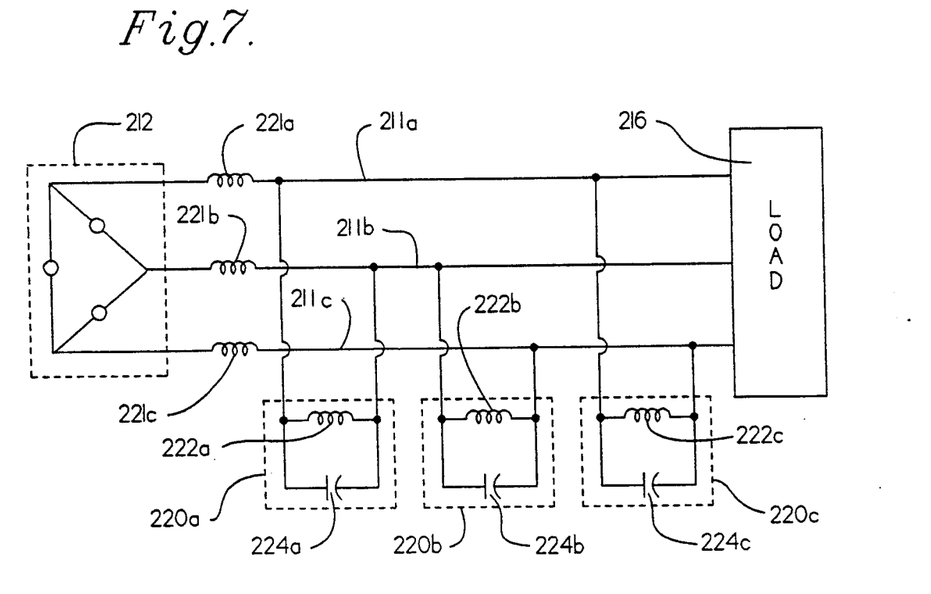
FIG. 7 is a schematic diagram of another embodiment of the alternating current storage module connected in a 3-phase delta-configuration power system.

According to another embodiment of the invention and with reference to FIG. 7, a three-phase power source 212 in the delta configuration is shown. Three identical storage modules 220a, 220b, 220c, each comprising an inductor 222a, 222b, 222c and a capacitor 224a, 224b, 224c connected in parallel are constructed. The storage modules 220a, 220b, 220c are tuned to the system line frequency and are connected between conductor 211a and conductor 211b, conductor 211b and conductor 211c, and conductor 211a and conductor 211c, respectively, and in parallel with the load 216. Inductors 221a, 221b, 221c may be advantageously placed in series between the power source 212 and the storage modules 220a, 220b, 220c along conductors 211a, 211b, 211c, respectively.

It will be understood that a variety of additional components may be added to tailor the storage module 20 of the present invention to specific applications. By way of example only and not intended to be limited thereby, some of such features may include common mode and noise canceling filters and spike arresting devices to limit voltage deviations at the sensitive load. The storage module 20 may be electrically scaled to provide a product directed primarily to the smaller applications, for example, a personal computer as well as larger facility-wide storage applications.

Larger storage module 20 devices may be constructed in single or multiple segments as needed to provide the best compromise for layout and implementation. Multiple storage modules 20 may be added to the power system line 11 without concern for interaction between similar or different sized units as each storage module 20 remains electrically isolated from the others. In installations where the loading characteristics may be dynamic or applications change frequently, storage modules 20 that are significantly larger than sometimes needed may be installed. Any extra capacity will not cause degradation of the operation of the power system and will serve to improve the waveform shape by reducing harmonic distortion. Unlike typical noise filter devices, the storage module 20 components are mutually nulling and do not appear as lumped constants that could affect power system stability. That permits the storage module 20 devices to be added to an existing installation without an extensive analysis of the power distribution system.

As such, the storage module 20 of the present invention when connected across a load 16 provides a cost-effective and operationally effective solution to the problems caused by harmonic distortion or nonlinear loading on a power signal. The storage module 20 corrects harmonic voltage and current distortion, eliminates voltage transients including low level spikes (plus or minus), while being immune to common control circuit limitations (roll off frequencies). The resonant circuit of the storage module 20 mutually nulls the effects of both the inductive and capacitive reactances and does not disturb distribution systems. As such, the storage module 20 provides energy to fill in short term line voltage dropouts or dips, thereby improving the waveform of the power distribution system to which it is attached. By installing the storage module 20 in parallel with the power line, no fault or surge current needs to be passed through the storage module 20. The storage module 20 may be any size electrically and may be scaled to different line frequencies. Idling power consumption is very low and efficiency is high as no power is transformed for storage, that is, no conversion of energy is needed. The capacity may be increased by adding numerous smaller storage modules 20 in parallel without interaction amongst the storage modules 20. Finally, the storage module may be configured for single or three-phase power systems as required.

It will be understood that variations and changes in the details of the present invention as herein described and illustrated may be made by those skilled in the art without departing from the spirit, principle, and scope of the present invention. Accordingly, it is expressly intended that all such equivalents, variations, and changes therefrom which fall within the principle and scope of the present invention as described herein and defined in the claims be embraced thereby.

What is claimed is:

1. A circuit for correcting perturbations in a power system signal operating at a system line frequency said circuit comprising:

capacitive means for drawing a capacitive current;

first inductive means for drawing an inductive current substantially equal in amplitude and substantially one hundred eighty degrees out of phase with said capacitive current, said first inductive means connected in parallel with said capacitive means to form a storage module for storing energy therein and wherein said storage module is tuned to resonate at said system line frequency, wherein said storage module is connected n parallel across a load and wherein said storage module as circulating currents of substantially the same amplitude as a load current, wherein said storage module absorbs voltage perturbations in excess of the amplitude of said power system signal at all frequencies above and below said system line frequency and wherein said storage module provides energy to restore notches in the amplitude of said power system signal at all frequencies above and below said system line frequency; and a second inductive means connected in series between a power source and said load for isolating said power source from said load.

2. A circuit for correcting perturbations in a three-phase power system signal operating at a system line frequency, said power system having a first conductor, a second conductor, a third conductor, and a neutral conductor connected in a wye-configuration, said circuit comprising:

first capacitive means for drawing a capacitive current;

first inductive means for drawing an inductive current substantially equal in amplitude and substantially one-hundred eighty degrees out of phase with said capacitive current, said first inductive means connected in parallel with said first capacitive means to form a first storage module for storing energy therein and wherein said first storage module is tuned to resonate at said system line frequency, said first storage module connected between said first conductor and said neutral conductor and wherein said first storage module has circulating currents of substantially the same amplitude as a first load current, wherein said first storage module absorbs voltage perturbations in excess of the amplitude of said power system signal on said first conductor at all frequencies above and below said system line frequency and wherein said first storage module provides energy to restore notches in the amplitude of said power system signal on said first conductor at all frequencies above and below said system line frequency;

second capacitive means for drawing a second capacitive current;

second inductive means for drawing a second inductive current substantially equal in amplitude and substantially one-hundred eighty degrees out of phase with said second capacitive current, said second inductive means connected in parallel with said second capacitive means to form a second storage module for storing energy therein and wherein said second storage module is tuned to resonate at said system line frequency, said second storage module connected between said second conductor and said neutral conductor and wherein said second storage module has circulating currents of substantially the same amplitude as a second load current, wherein said second storage module absorbs voltage pertubations in excess of the amplitude of said power system on said second conductor at all frequencies above and below said system line frequency and wherein said second storage module provides energy to restore notches in the amplitude of said power system signal on said second conductor at all frequencies above and below said system line frequency;

third capacitive means for drawing a third capacitive current; ad third inductive means for drawing a third inductive current substantially equal in amplitude and substantially one-hundred eighty degrees out of phase with said third capacitive current, said third inductive means connected in parallel with said third capacitive means to form a third storage module for storing energy therein and wherein said third storage module is tuned to resonate at said system line frequency, said third storage module connected between said third conductor and said neutral conductor and wherein said third storage module has circulating currents of substantially the same amplitude as a third load current, wherein said third storage module absorbs voltage perturbations in excess of the amplitude of said power system signal on said third conductor at all frequencies above and below said system line frequency and wherein said third storage module provides energy to restore notches in the amplitude of said power system signal on said third conductor at all frequencies above and below said system line frequency.

3. The circuit of claim 2 further comprising a first series inductive means connected in series between a three-phase power source and said first storage module along said first conductor for isolating said power source, a second series inductive means connected in series between said power source and said second storage module along said second conductor for isolating said power source, and a third series inductive means connected in series between said power source and said third storage module along said third conductor for isolating said power source.

4. A circuit for correcting perturbations in a three-phase power system signal operating at a system line frequency, said power system having a first conductor, a second conductor and a third conductor connected in a delta configuration, said circuit comprising first capacitive means for drawing a first capacitive current;

firs inductive means for drawing a first inductive current substantially equal in amplitude and substantially one-hundred eighty degrees out of phase with said first capacitive current, said first inductive means connected in parallel with said first capacitive means to form a first storage module for storing energy therein and wherein said first storage module is tuned to resonate at said system line frequency, said first storage module connected between said first conductor and said second conductor and wherein said first storage module has circulating currents of substantially the same amplitude as a first load current, wherein said first storage module absorbs voltage perturbations in excess of the amplitude of said power system signal on said first conductor at all frequencies above and below said system line frequency and wherein said first storage module provides energy to restore notches in the amplitude of said power system signal on said first conductor at all frequencies above and below said system line frequency;

second capacitive means for drawing a second capacitive current;

second inductive means for drawing a second inductive current substantially equal in amplitude and substantially one-hundred eighty degrees out of phase with said second capacitive current, said second inductive means connected in parallel with said second capacitive means to form a second storage module for storing energy therein and wherein said second storage module is tuned to resonate at said system line frequency, said second storage module connected between said second conductor and said third conductor and wherein said second storage module as circulating currents of substantially the same amplitude as a second load current, wherein said second storage module absorbs voltage perturbations in excess of the amplitude of said power system signal on said second conductor at all frequencies above and below said system line frequency and wherein said second storage module provides energy to restore notches in the amplitude of said power system signal on said second conductor at all frequencies above and below said system line frequency;

third capacitive means for drawing a third capacitive current; ad third inductive means for drawing a third inductive current substantially equal in amplitude and substantially one-hundred eighty degrees out of phase with said third capacitive current, said third inductive means connected in parallel with said third capacitive means to form a third storage module for storing energy therein and wherein said third storage module is tuned to resonate at said system line frequency, said third storage module connected between said first conductor and said third conductor and wherein said third storage module has circulating currents of substantially the same amplitude as a third load current, wherein said third storage module absorbs voltage perturbations in excess of the amplitude of said power system signal on said third conductor at all frequencies above and below said system line frequency and wherein said third storage module provides energy to restore notches in the amplitude of said power system signal on said third conductor at all frequencies above and below said system line frequency.

5. The circuit of claim 4 further comprising a first series inductive means connected in series between a three-phase power source and said first storage module along said first conductor for isolating said power source, a second series inductive means connected in series between said power source and said second storage module along said second conductor for isolating said power source, and a third series inductive means connected in series between said power source and said third storage module along said third conductor for isolating said power source.

6. A method for correcting voltage distortions in a power system signal having a system line frequency comprising the steps of:

forming a storage module comprising a capacitive means for drawing a capacitive current in parallel with a first inductive means for drawing an inductive current equal i amplitude and one hundred eighty degrees out of phase with sad capacitive current, wherein said storage module is tuned to a resonate frequency equal to said system line frequency, wherein said first storage module absorbs voltage perturbations in excess of the amplitude of said power system signal at all frequencies above and below said system line frequency and wherein said first storage module provides energy to restore notches in the amplitude of said power system signal at all frequencies above and below said system line frequency;

connecting said storage module in parallel with a load; and inserting a second inductive means for isolating a power source from said load in series between said power source and said load.

7. A method for correcting voltage distortions in a three-phase power system signal having a system line frequency, said power system having a first conductor, a second conductor, a third conductor, and a neutral conductor connected in a wye-configuration, said method comprising the steps of:

forming a first storage module comprising a first capacitive means for drawing a first capacitive current in parallel with a first inductive means for drawing a first inductive current equal in amplitude and one hundred eighty degrees out of phase with said first capacitive current, wherein said first storage module is tuned to a resonant frequency equal to said system line frequency, wherein said first storage module absorbs voltage perturbations in excess of the amplitude of said power system signal at all frequencies above and below said system line frequency and wherein said first storage module provides energy to restore notches in the amplitude of said power system signal at all frequencies above and below said system line frequency;

connecting said first storage module between sad first conductor and said neutral conductor in parallel with a load;

forming a second storage module comprising a second capacitive means for drawing a second capacitive current in parallel with a second inductive means for drawing a second inductive current equal in amplitude and one hundred eight degrees out of phase with said second capacitive current, wherein said second storage module is tuned to a resonant frequency equal to said system line frequency, wherein said second storage module absorbs voltage perturbations in excess of the amplitude of said power system signal at all frequencies above and below said system line frequency and wherein said second storage module provides energy to restore notches in the amplitude of said power system signal at all frequencies above and below said system line frequency;

connecting said second storage module between said second conductor and said neutral conductor in parallel with said load;

forming a third storage module comprising a third capacitive means for drawing a third capacitive current in parallel with a third inductive means for drawing a third inductive current equal in amplitude and one hundred eighty degrees out of phase with said third capacitive current, wherein said third storage module is tuned to a resonant frequency equal to said system line frequency, wherein said third storage module absorbs voltage perturbations in excess of the amplitude of said power system signal at all frequencies above and below said system line frequency and wherein said third storage module provides energy to restore notches in the amplitude of said power system signal at all frequencies above and below said system line frequency; and connecting said third storage module between sad third conductor and said neutral conductor in parallel with said load.

8. The method of claim 7 further comprising the steps of inserting a first series inductive means in series between a three-phase power source and said first storage module along said first conductor for isolating said power source, inserting a second series inductive means in series between said three-phase power source and said second storage module along said second conductor for isolating said power source, and inserting a third series inductive means in series between said three-phase power source and said third storage module along said third conductor for isolating said power source.

9. A method for correcting voltage distortions in a three-phase power system signal having a system line frequency, said power system having a first conductor, a second conductor, and a third conductor connected in a delta configuration, said method comprising the steps of:

forming a first storage module comprising a first capacitive means for drawing a first capacitive current in parallel with a first inductive means for drawing a first inductive current equal in amplitude and one hundred eighty degrees out of phase with said first capacitive current, wherein said first storage module is tuned to a resonant frequency equal to said system line frequency, wherein said first storage module absorbs voltage perturbations in excess of the amplitude of said power system signal at all frequencies above and below said system line frequency and wherein said first storage module provides energy to restore notches in the amplitude of said power system signal at all frequencies above and below said system line frequency;

connecting said first storage module between said first conductor and said second conductor in parallel with a load;

forming a second storage module comprising a second capacitive means for drawing a second capacitive current in parallel with a second inductive means for drawing a second inductive current equal in amplitude and one hundred eighty degrees out of phase with said second capacitive current, wherein said second storage module is tuned to a resonant frequency equal to said system line frequency, wherein said second storage module absorbs voltage perturbations in excess of the amplitude of said power system signal at all frequencies above and below said system line frequency and wherein sad second storage module provides energy to restore notches in the amplitude of said power system signal at all frequencies above and below said system line frequency;

connecting said second storage module between said second conductor and said third conductor in parallel with sad load;

forming a third storage module comprising a third capacitive means for drawing a third capacitive current in parallel with a third inductive means for drawing a third inductive current equal in amplitude and one hundred eighty degrees out of phase with said third capacitive current, wherein said third storage module is tuned to a resonant frequency equal to said system line frequency, wherein said third storage module absorbs voltage perturbations in excess of the amplitude of said power system signal at all frequencies above and below said system line frequency and wherein said third storage module provides energy to restore notches in the amplitude of said power system signal at all frequencies above and below said system line frequency; ad connecting said third storage module between said first conductor and said third conductor in parallel with said load.

10. The method of claim 9 further comprising the steps of inserting a first series inductive means in series between a three-phase power source and said first storage module along said first conductor for isolating said power source, inserting a second series inductive means in series between said three-phase power source and said second storage module along said second conductor for isolating said power source, and inserting a third series inductive means in series between said three-phase power source and said third storage module between said third conductor for isolating said power source.

* * * * *

UNITED STATES PATENT AND TRADEMARK OFFICE
CERTIFICATE OF CORRECTION

Page 1 of 2

PATENT NO. : 5,323,304
DATED : June 21, 1994
INVENTOR(S) : George K. Woodworth

It is certified that error appears in the above-indentified patent and that said Letters Patent is hereby corrected as shown below:

Col. 7, line 5, delete "I2" and substitute therefor --12--.

Col. 7, line 13, delete "20" and substitute therefor --20--.

Col. 9, line 13, delete "n" and substitute therefor --in--.

Col. 9, line 14, delete "as" and substitute therefor --has--.

Col. 10, line 13, delete "ad" and substitute therefor --and--.

Col. 10, line 51, delete "comprising" and substitute therefor --comprising:--.

Col. 10, line 54, delete "firs" and substitute --first--.

Col. 11, line 32, delete "ad" and substitute therefor --and--.

UNITED STATES PATENT AND TRADEMARK OFFICE
CERTIFICATE OF CORRECTION

PATENT NO. : 5,323,304
DATED : June 21, 1994
INVENTOR(S) : George K. Woodworth

It is certified that error appears in the above-indentified patent and that said Letters Patent is hereby corrected as shown below:

Col. 12, line 4, delete "i" and substitute therefor --in--.

Col. 12, line 5, delete "sad" and substitute therefor --said--.

Col. 12, line 42, delete "sad" and substitute therefor --said--.

Col. 12, line 49, delete "eight" and substitute therefor --eighty--.

Col. 13, line 12, delete "sad" and substitute therefor --said--.

Col. 14, line 19, delete "sad" and substitute therefor --said--.

Col. 14, line 35, delete "ad" and substitute therefor --and--.

Signed and Sealed this

Third Day of January, 1995

Attest:

BRUCE LEHMAN

*Attesting Officer*     *Commissioner of Patents and Trademarks*